United States Patent [19]

West et al.

[11] Patent Number: 4,776,130

[45] Date of Patent: Oct. 11, 1988

[54] PLANT FERTILIZER HOLDER

[75] Inventors: Mary J. West, Dalton; Christopher J. Hornung, Madison, both of Wis.

[73] Assignee: Westwinds Gallery, Inc., Madison, Wis.

[21] Appl. No.: 865,296

[22] Filed: May 22, 1986

[51] Int. Cl.⁴ .................................... A01G 29/00
[52] U.S. Cl. ........................................... 47/48.5
[58] Field of Search .............. 47/48.5, 79; 206/437

[56] References Cited

U.S. PATENT DOCUMENTS

| | | | |
|---|---|---|---|
| 1,005,675 | 10/1911 | Van Luven | 47/48.5 |
| 2,067,589 | 1/1937 | Antrim | 47/48.5 |
| 2,380,721 | 7/1945 | Brigden | 47/48.5 |
| 3,005,287 | 10/1961 | Dudley | 47/48.5 |
| 3,151,415 | 10/1964 | James | 47/48.5 |
| 3,821,863 | 7/1974 | Chan | 47/48.5 |
| 3,914,900 | 10/1975 | Bigelow et al. | 47/48.5 |
| 4,089,133 | 5/1978 | Duncan | 47/48.5 |

*Primary Examiner*—Richard T. Stouffer
*Attorney, Agent, or Firm*—Lathrop & Clark

[57] ABSTRACT

A plant fertilizer holder, which includes a below-ground needle or spike, and an above-ground figurine or handle, allows the user to insert or withdraw the spike into the ground of a potted plant. The below-ground portion is slotted to dimensions which allow a commercial plant food spike to be placed therein, and to be replaced when that amount is used up. The above-ground portion allows the user to periodically withdraw the spike to check to see if there remains any plant food, and to replace when that supply is exhausted.

1 Claim, 1 Drawing Sheet

PLANT FERTILIZER HOLDER

TECHNICAL FIELD

The present invention relates in general to the fertilization of plants by the insertion of a solid spike containing plant food into the soil, and in particular to the provision of a holder for such a spike.

BACKGROUND OF ART

The art is cognizant of devices which are inserted into the soil to facilitate the distribution of water and/or fertilizer, or to aerate the soil to promote better plant health. Examples of teachings of such devices include U.S. Pat. 3,914,900 which illustrates a spike holding a seed and a fertilizer plug. Examples of teachings of tubes for introducing water or liquid nutrients into the soil around a plant may be found in U.S. Pat. Nos. 4,037,361, 4,089,133, 4,381,623, and 4,393,622. U.S. Pat. No. 4,175,356 discloses a similar tubular device for soil aeration. The disclosure of U.S. Pat. No. 1,490,865 teaches a device for introducing fertilizer into the roots of trees. The referred to patents all employ means of distributing water or nutrients more directly to the roots by a system which is buried or injected into the soil by something such as a spike.

One of the conventional methods of feeding plants features a non-retractable spike inserted to a point below the surface of the ground, and not visible to the user. This method does not allow the user to know when the plant supply of plant nutrient has been exhausted, and therefore there is the chance that the user may guess incorrectly and either overfeed or underfeed the plant. Other methods suggest a tubular reservoir or a funnel by which the water and nutrients (in liquid form) are added more directly to the roots. This requires that the water-nutrient solution be pre-mixed and regularly monitored.

SUMMARY OF THE INVENTION

The present invention is summarized in that a holder for plant fertilizer includes a shaft portion including a suitably shaped vertical cavity to hold a plant food spike and an above ground handle portion provided with a decorative figurine thereon so that the holder may be periodically withdrawn and re-inserted.

The present invention also features an above-ground portion which may serve as a handle to withdraw the spike from the ground. Such a handle may be manifested in a number of ornamental ways, selection of the type of which would be at the discretion of the user.

It is an object of the present invention to provide an effective means of dispersing plant food to the roots of a plant.

It is a further object of the present invention to optimize the dispersion of the plant food by incorporating an above-ground handle with the spike, thereby allowing the user to periodically check the plant food and replace only when expired. Such an arrangement therefore will not allow the user to overfeed or underfeed the plant to its detriment. Monitoring consumption of the plant food by periodic checks will also prevent the underfeeding of the plant.

It is yet another object of the invention to incorporate a handle which is not merely functional, but also aesthetically appealing to the user.

Other objects, advantages and features of the present invention will become apparent from the following detailed specification when taken in conjunction with the accompanying drawings.

DETAILED DESCRIPTION OF THE PREFERRED EMBODIMENT

Figure 1:
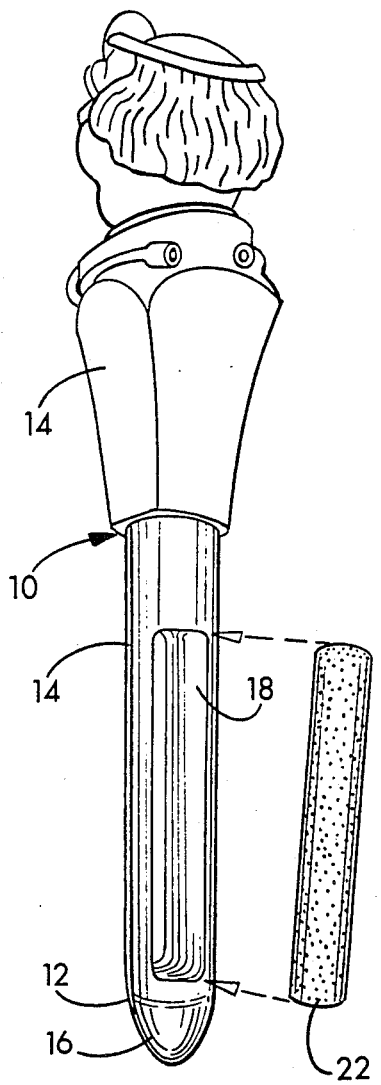
FIG. 1 is a perspective view of a preferred embodiment of a plant fertilizer holder constructed in accordance with the present invention.
Figure 2:
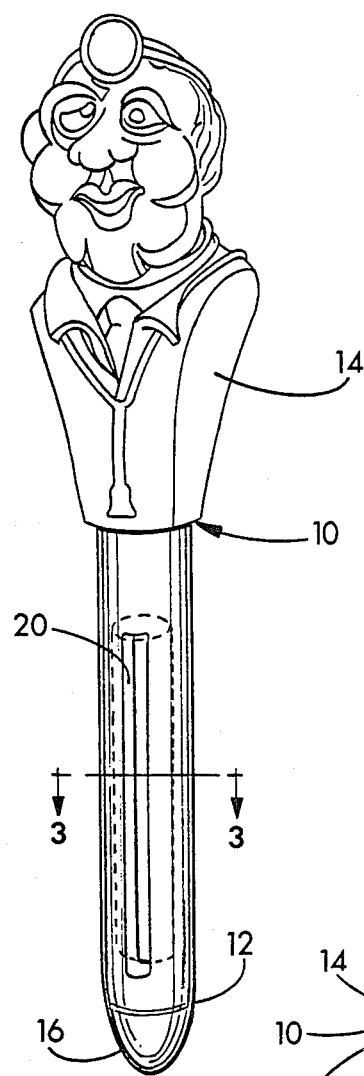
FIG. 2 is a lateral cross-section taken along the section lines 2—2 shown in FIG. 1.

Shown in FIG. 1, and generally illustrated at 10, is a plant fertilizer holder constructed in accordance with the present invention. The plant fertilizer 10 includes generally a spike portion 12 and a handle portion 14. The plant fertilizer holder 10 itself is formed as a molded unitary object preferably formed of a synthetic resin or other easily moldable material which is both durable and economical.

The spike portion 12 includes an elongated vertical shaft 14 which is generally cylindrical in shape, although it may optionally be provided with a slight taper so as to be slightly narrower at its lower end. At its extreme lower end the spike portion 12 terminates in a generally conical point 16 which is rounded as can be seen in the drawing figures. Along the greater part of its length, the spike portion is provided with a fertilizer cavity 18. The fertilizer cavity 18 is formed as a cylindrical cavity centered in the shaft 14 of the spike portion 12 and then extends tangentially outward to the periphery of the shaft 14. The centralized character of the cavity 18 and its extension to the shaft 14 periphery can best be viewed in the cross-sectional view of FIG. 3. Also formed in the shaft 14 of the spike portion 14 is a percolation slot 20. The slot 20 is an elongated rectangular slot, as long as the cavity 18, which extends into the shaft 14 to join the central portion of the cavity 18. As can again best be seen in FIG. 3, the slot 20 is oriented radially oppositely from the side of the shaft 14 onto which the cavity 18 opens so that a linear passage exists through the center of the shaft 14 from one side thereof to the other. The slot 20 is narrower than the interior of the cavity 18 for reasons that will become apparent below.

The handle portion 14 is the upper remaining part of the plant fertilizer holder 10. The handle portion 14 is a size and shape that it can be easily hand manipulated but is not, as can be seen, overtly styled as a handle. Instead the handle portion 14 is constructed in the shape of a decorative human figurine. In the embodiment of FIGS. 1-4, the decorative human figurine is that of a caricature of a physicin. Other fanciful figures, human or otherwise, are contemplated within the spirit of the present invention.

Figure 4:
FIG. 4 shows the plant spike as it would appear in its intended use.

In its operation, the plant fertilizer holder 10 of the present invention is intended to allow a solid cylinder or spike of plant nutrient fertilizer to be removably inserted into the plant bedding. A popular form of fertilizer packaging for house plant is the cylindrical or spike form, and a plant food spike 22 is illustrated in FIG. 1. As also can be seen in FIG. 1, the cavity 18 is of suitable width and length that a conventionally sized plant food spike 22 can be inserted laterally into the cavity 18. Preferably the size of the cavity 18 is selected so that a typical plant food spike 22 must be wedged snuggly into the cavity 18 so that the spike 22 will remain in the cavity 18 once inserted. The plant fertilizer holder 10 is then inserted into the bedding soil of a plant as viewed in FIG. 4. The plant 28 of FIG. 4 is contained in a plant pot 24 which is filled with bedding soil 26. The plant fertilizer holder 10 has been vertically inserted into the bedding soil 26 with the point 16 leading. The plant fertilizer holder 10 is pressed into the soil 26 until the spike portion 12 of the holder is largely buried in the soil while the decorative figurine of the handle portion 14 remains above the soil surface.

Figure 3:
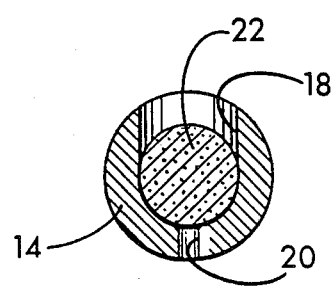
FIG. 3 is a rear perspective view of the plant spike made in accord with the present invention, shown from the opposite side of FIG. 1.

The plant fertilizer holder 10 of the present invention is specifically intended to facilitate the efficient fertilization of bedding plants in general, and house plants in particular. Once a plant food spike 22 has been inserted into the holder 10 and inserted in the plant bed, the holder 10 can easily be removed from time to time to visually inspect the status of the plant food spike 22 to determine when it has been expended. Note, as best seen in FIG. 3, that the provision for the slot 20, on the opposite side of the shaft 14 and extending into the cavity 18, ensures that a complete passage exists through the center of the shaft 14 and around the plant food spike 22 therein. This allows percolation and circulation of moisture through the holder 10 to efficiently dissolve and distribute the material of the plant food spike 22. Thus the holding of the plant food spike 22 in the holder does not materially affect the delivery of the nutrient material to the plant.

The provision for the decorative figurine on the handle portion 14 also contributes to the overall usefulness of the holder 10 by making it aesthetically acceptable for installation in the plant bedding for long periods of time. The figurine is, of course, arranged a small distance from the cavity 18 holding the fertilizer so that the appearance of the decorative figurine in the plant bed does not necessarily betray the function of the device. The provision for the handle portion 14, including the figurine, also ensures that the holder 10 can be repeatedly inserted and removed, for inspection, without the necessity of the user contacting the soil or otherwise disturbing the plant.

It is to be understood that the present invention is not limited to the construction and arrangement of parts illustrated here, but embraces all such modified forms thereof as come within the scope of the following claim.

What is claimed is:

1. A plant fertilizer holder to hold a plant food spike comprising:

a pike portion including a vertical cylindrical shaft and a conical spike at the end of the shaft and including a vertically oriented cavity therein adapted to receive and hold a plant food spike therein;

a handle portion above and integrally connected to the spike portion and sized so as to be easily manually manipulable so that the holder may be periodically removed for inspection, the handle portion constructed as a decorative figurine so that it is aesthetically compatible with house plant bedding, the plant fertilizer holder being formed from an easily moldable and durable material;

the cavity in the spike portion being located centered in the shaft and extending tangentially outward to and through the periphery of the shaft, the cavity being of a predetermined length and width and closed at both its top and bottom, the spike portion being solid and substantially free of any open space upwardly from said cavity to said handle portion and also being substantially free of any open space below said cavity, such that the cavity is adapted to have an appropriately sized plant food spike inserted therein so that such plant food spike is received wedged snugly when inserted in the cavity, the cavity also formed in the shaft a small distance from the handle portion so that the appearance of the decorative figurine does not betray the function of the plant fertilizer holder; and the spike portion also having a slot formed in the shaft thereof on its side opposite the cavity equal in length to the length of the cavity and communicating therewith and with the periphery of the shaft, said slot and said cavity forming throughout the length of the cavity a linear passage through the center of the shaft from one side to the other to allow moisture to flow through the shaft past the entire plant food spike when received in the cavity.

* * * * *